INVENTORS.
PHILIP A. MURRAY.
CARL H. GEARY, JR.
BY
ATTORNEY.

United States Patent Office 3,499,503
Patented Mar. 10, 1970

3,499,503
LUBRICATION SYSTEM
Philip A. Murray, Pittsburgh, and Carl H. Geary, Jr., Greensburg, Pa., assignors to Carrier Corporation, Syracuse, N.Y., a corporation of Delaware
Filed Mar. 31, 1967, Ser. No. 627,549
Int. Cl. F16n 1/00; F01m 1/00; F16c 1/24
U.S. Cl. 184—1          2 Claims

ABSTRACT OF THE DISCLOSURE

A lubrication system for a rotating machine having oil ring lubricated bearings wherein the action of the shaft or journal as it rotates in the bearing is used to pump lubricant trapped therebetween to a remote location to satisfy a lubrication requirement.

Background of invention

This invention relates broadly to lubrication systems for rotating machinery. More particularly, the invention relates to lubrication systems of the kind employing oil rings as opposed to a pressurized lubrication system using a lubricant pump and closed circuit for lubricant distribution.

In rotating machinery such as gas or steam powered turbines, often the power shaft is mounted in conventional bearings to which lubricant is supplied by oil rings. This type of lubrication is well known and described, for example, in the publication entitled "Design of Machine Elements" by Faries, Third edition, pages 305 and 306. Briefly, the oil ring is arranged within the bearing assembly so as to encircle the power shaft with limited engagement between the parts. The oil ring has a diameter in excess of the diameter of the bearing and is arranged above a pool of lubricant so that at least a portion of the circumference of the ring is submerged within the lubricant. Rotation of the power shaft within the bearing causes rotation of the oil rings. The inner surface of the oil rings is usually provided with grooves or the like so that oil present therein may cling thereto and may be carried upwardly and deposited in the bearing assembly for flow in the usual manner.

In hydrodynamic bearings it is well known that a shaft or journal rotating within a bearing "floats" on a film of oil or lubricant supplied to the bearing. It is also well known that the journal because it is supported in the bearing and because of tolerance difficulties rotates on an axis eccentric to the axis of the bearing so that the film of oil undergoes pressure changes due to the changes in volume available for its disposition during rotation of the journal.

Very often rotating machinery may have a lubrication requirement separate from the bearing requirement in which it is impractical to use oil rings. For example, more complicated governors for regulating shaft speed often include gear elements requiring lubrication.

Summary of the invention

The invention involves a lubrication system for rotating machinery having oil ring lubrication means and remote lubrication requirements that make it impractical to employ oil rings wherein energy imparted to the oil film by the rotation of the power shaft within a journal bearing is used to pump a portion of the lubricant to the remote location requirement.

Brief description of the drawing

FIGURE 3 is a somewhat schematic view taken along lines III—III in FIGURE 1 illustrating the relationship between the various parts of a bearing assembly incorporating the invention.

Description of the preferred embodiment

Figure 1:
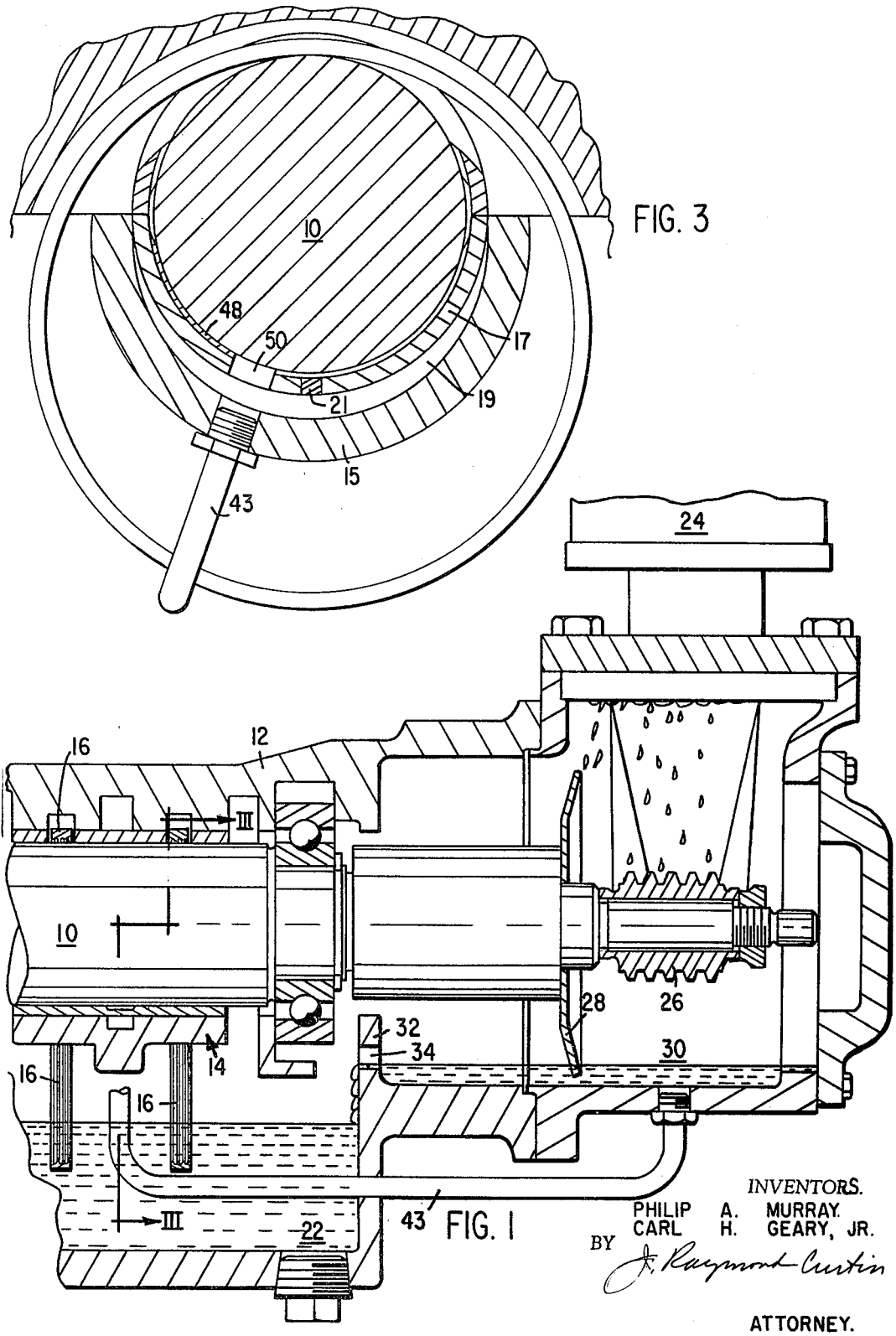
FIGURE 1 is a partial view in section of a rotating machine equipped with a lubrication system forming the subject of this invention.

Machinery of the type to which the lubrication system forming the subject of the invention may be applied is illustrated in part in FIGURE 1. A power shaft 10 of a machine such as a turbine is shown arranged within a casing or housing 12 having means for mounting a bearing assembly 14. As is conventional of machinery of this type, the parts described above with the exception of the power shaft are formed in two halves, an upper and lower half and thereafter united.

Arranged within the bearing assembly 14 are spaced oil rings 16 secured within the bearing so as to rotate in response to rotation of the shaft although at a somewhat slower rate. The oil rings 16 are arranged so that a portion of the periphery resides within a pool of lubricant 22 disposed within the casing 12.

The power shaft as shown in FIGURE 1 is supported in the bearing assembly 14. Located further outward on the shaft is a mechanism for sensing the speed of the shaft. More particularly, the mechanism includes a governor 24 which cooperates with a gear 26 secured to the end of the power shaft 10. Casing 12 is formed so that a sump 30 is likewise arranged to accommodate lubricant. An overflow opening 34 in a portion of internal wall 32 drains oil or lubricant from the sump 30 to the sump 22.

A disc member 28 is arranged on shaft 10 so as to fling oil clinging to the portion of its periphery residing within the sump 30 against a wall or abutment arranged adjacent the gear 26 so as to drain lubricant thereon. It is a primary object of this invention to provide an arrangement for supplying lubricant from the main sump 22 to the remote sump 30 without incurring the expense of adding a separate pumping unit.

Figure 2:
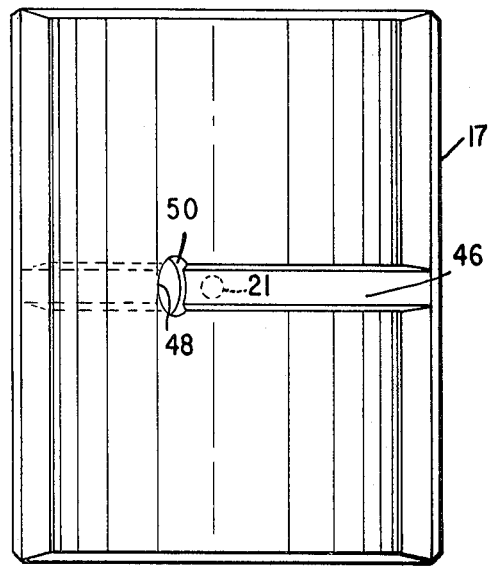
FIGURE 2 is a top plan view of a bearing liner employed with the machine illustrated in FIGURE 1.

In order to accomplish this object, the bearing assembly is constructed in the manner illustrated in FIGURES 2 and 3. Referring first to FIGURE 3, there is shown a lower bearing retainer 15. Positioned within the retainer 15 is lower bearing liner 17. The parts are formed so as to provide a space 19 therebetween. The space 19 normally serves as a header for receiving lubricant from a branch line in a lubrication system utilizing a separate pump. From the space 19, lubricant in a conventional pressure system enters the clearance space between shaft 10 and the liner via opening 21, shown as plugged for a purpose to be later described.

As earlier described, the shaft 10 "floats" on a film of lubricant interposed between the bearing liner and the shaft. The clearance space between these two parts accommodates the film of lubricant. The film of lubricant travels about the circular path defined by the surface of the bearing liner. The oil rings are spaced longitudinally of the bearing assembly as shown in FIGURE 1. Charges of lubricant are delivered to the clearance space by the rings rotating through slots (not shown) provided in the upper bearing liner and retainer. Lubricant drains from the rings into the clearance space and flows longitudinally as well as in a circular path. Located about midway in the lower bearing liner is a groove 46 into which the delivered lubricant flows. The portion of the charge traveling in the groove 46 is accelerated by the motion of the shaft resulting in the creation of a velocity head.

Figure 4:
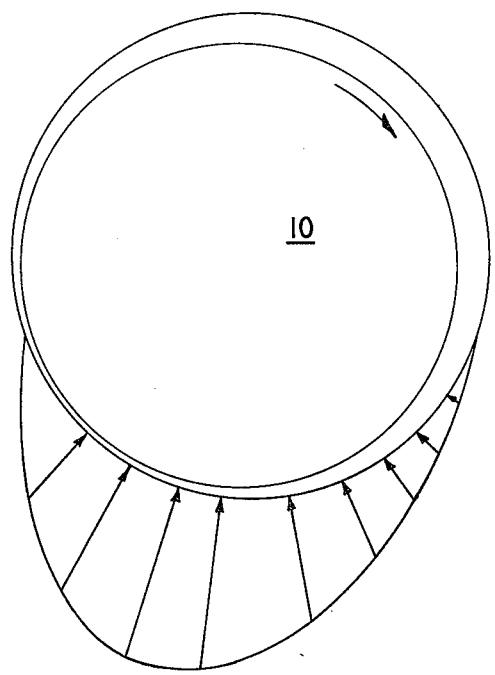
FIGURE 4 is a graph depicting the relationship between the force exerted on the lubricant in a bearing and the position of the rotating shaft within the bearing with lubricant being introduced in the manner accomplished by oil ring lubrication means.

It has been found that if the groove 46 is terminated by a dam 48, formed by filling in the groove with material compatible wtih journal rotation, and an opening 50 provided in the liner, trapped lubricant will flow with considerable pressure into the space 19. Conduit 43 connects space 19 with sump 30 so that lubricant is fed to sump 30 in the form of slugs or small charges. The pumping action thus obtained is continuous so long as shaft 10 rotates. The opening 50 is advantageously located about 20° in the direction of rotation from a vertical line through the center of the shaft. This position appears to lie along a point representing maximum pressure on the oil film or trapped lubricant charge, note FIGURE 4. By forming the dam in the manner described, the velocity head represented by the trapped lubricant is converted to a pressure head as the charge is separated from the shaft by the "shearing" action of the dam 48.

By plugging the normal inlet opening 21, a conventional liner may be modified to provide a liner of the kind described. The lubricant supplied to conduit 43 is delivered to sump 30. The disc 28 then flings the lubricant against a wall from which it flows in the manner shown in FIGURE 1. Any lubricant in excess of that necessary to lubricate gears 26 in the manner described returns to the sump 22 via opening 34. Thus the lubrication requirement represented by gears 26 may be readily satisfied without adding an additional pump.

While we have described a preferred embodiment of our invention, it will be understood that the invention is not limited thereto since it may be otherwise embodied within the scope of the following claims.

We claim:

1. The method of supplying lubricant to a location, in a rotating machine, remote from the journal bearings of the machine wherein at least one journal bearing is lubricated by a ring revolving under the influence of the journal through a body of lubricant so that lubricant clings to the inner surface and is subsequently fed to the space between the journal and the bearing or bearing liner which consists in the steps of:

delivering lubricant by the ring to at least one groove formed in the journal bearing liner;
  collecting the delivered lubricant in the groove at a predetermined circumferential position;
  utilizing the energy imparted by the journal as it rotates in the liner to transmit the lubricant trapped therebetween to the selected location;
  accumulating the transmitted lubricant at the location; and thereafter.
  slinging the accumulated lubricant over the surfaces requiring lubrication.

2. A lubrication system for machinery including a power shaft supported in at least one bearing assembly, said machinery having a lubrication requirement remote from the bearing assembly, comprising:

a power shaft;
  a bearing assembly for supporting the power shaft, said bearing assembly including bearing liner means engaging said power shaft;
  at least one ring arranged within said bearing assembly to surround said shaft and have a portion of the inner surface drivingly engaged by a portion of the power shaft whereby said ring rotates at a rotational speed slower than said power shaft;
  a supply of lubricant disposed beneath said bearing assembly in the path of travel of the ring as it rotates under the influence of the power shaft, the rotation of said ring causing portions of the lubricant to cling to the ring, be elevated and be introduced into the space between the shaft and liner;
  said bearing liner having a transverse groove in the surface thereof, said groove terminating at a predetermined distance from the lowermost point of the bearing liner;
  means forming an opening in the groove in the bearing liner adjacent the termination of said groove; and
  conduit means connected to said last-mentioned means to provide a path for the flow of lubricant in said groove through said opening under pressure developed by the power shaft rotating in said bearing liner.

References Cited

FOREIGN PATENTS 931,629 11/1947 France.
1,353,850 1/1964 France.
265,019 2/1927 Great Britain.

HOUSTON S. BELL, JR., Primary Examiner

U.S. Cl. X.R.

184—11, 13; 308—129